US009852127B2

(12) United States Patent
Dettinger et al.

(10) Patent No.: US 9,852,127 B2
(45) Date of Patent: Dec. 26, 2017

(54) PROCESSING PUBLISHING RULES BY ROUTING DOCUMENTS BASED ON DOCUMENT CONCEPTUAL UNDERSTANDING

(75) Inventors: Richard D. Dettinger, Rochester, MN (US); Frederick A. Kulack, Rochester, MN (US); Eric W. Will, Oronoco, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1385 days.

(21) Appl. No.: 12/128,114

(22) Filed: May 28, 2008

(65) Prior Publication Data

US 2009/0300471 A1 Dec. 3, 2009

(51) Int. Cl.
| | | |
|---|---|---|
| G06Q 10/00 | (2012.01) | |
| G06F 17/27 | (2006.01) | |
| G06F 17/22 | (2006.01) | |
| G06F 17/30 | (2006.01) | |
| G06Q 10/06 | (2012.01) | |
| G06Q 10/10 | (2012.01) | |

(52) U.S. Cl.
CPC ...... *G06F 17/2785* (2013.01); *G06F 17/2247* (2013.01); *G06F 17/30908* (2013.01); *G06Q 10/0633* (2013.01); *G06Q 10/103* (2013.01)

(58) Field of Classification Search
CPC .......................... G06Q 10/103; G06Q 10/0633
USPC .......................... 705/300–301, 1.1, 348, 7.27
See application file for complete search history.

(56) References Cited

U.S. PATENT DOCUMENTS

| | | | |
|---|---|---|---|
| 6,882,970 | B1 | 4/2005 | Garner et al. |
| 7,634,539 | B2 * | 12/2009 | Schwarz ................ G06Q 10/10 |
| | | | 709/204 |
| 9,269,273 | B1 | 2/2016 | Rose Charvet et al. |
| 2001/0032218 | A1 | 10/2001 | Huang |
| 2002/0091614 | A1 | 7/2002 | Yehia et al. |
| 2003/0120640 | A1 | 6/2003 | Ohta et al. |
| 2003/0163784 | A1 | 8/2003 | Daniel et al. |
| 2003/0187763 | A1 * | 10/2003 | Jordan .................. G06Q 40/00 |
| | | | 705/35 |
| 2004/0078373 | A1 | 4/2004 | Ghoneimy et al. |

(Continued)

FOREIGN PATENT DOCUMENTS

WO 02/46997 A1 6/2002

OTHER PUBLICATIONS

U.S. Appl. No. 12/128,133, entitled "Content Creation System Configured to Provide Feedback on Content Coverage", filed May 28, 2008.

(Continued)

*Primary Examiner* — Sujay Koneru
(74) *Attorney, Agent, or Firm* — Patterson + Sheridan, LLP (57) ABSTRACT

Embodiments of the invention may be used to improve enforcement and compliance with publishing rules in an automated and provable manner. Prior to publication, documents may be processed using publishing rules (workflows) based on conceptual analysis of document content. Additionally, embodiments of the invention include a content creation system configured to provide prompt feedback on content coverage. Such a system enables the creator of information to better understand what approval requirements apply to content they create and intend to publish, as the content is being created.

21 Claims, 8 Drawing Sheets

(56) References Cited

U.S. PATENT DOCUMENTS

| | | | |
|---|---|---|---|
| 2004/0083119 A1 | 4/2004 | Schunder et al. | |
| 2004/0111430 A1 | 6/2004 | Hertling et al. | |
| 2005/0216555 A1 | 9/2005 | English et al. | |
| 2006/0271526 A1 | 11/2006 | Charnock et al. | |
| 2006/0286536 A1* | 12/2006 | Mohler | G09B 5/00 434/350 |
| 2007/0150299 A1* | 6/2007 | Flory | G06Q 10/10 705/51 |
| 2007/0185865 A1 | 8/2007 | Budzik et al. | |
| 2007/0288518 A1 | 12/2007 | Crigler et al. | |
| 2007/0294278 A1 | 12/2007 | Vandermolen et al. | |
| 2008/0028300 A1* | 1/2008 | Krieger | G06Q 10/10 715/255 |
| 2008/0091458 A1 | 4/2008 | Blackman et al. | |
| 2008/0320006 A1 | 12/2008 | Hindawi et al. | |
| 2009/0031216 A1 | 1/2009 | Dressel et al. | |
| 2009/0192858 A1* | 7/2009 | Johnson | G06Q 10/06 705/7.11 |
| 2009/0204469 A1* | 8/2009 | Markram | G06F 17/30722 705/326 |
| 2009/0287685 A1 | 11/2009 | Charnock et al. | |
| 2009/0299998 A1 | 12/2009 | Kim | |
| 2009/0300064 A1 | 12/2009 | Dettinger et al. | |
| 2009/0300705 A1 | 12/2009 | Dettinger et al. | |

OTHER PUBLICATIONS

U.S. Appl. No. 12/128,114, entitled "Procesing Publishing Rules by Routing Documents Based on Document Conceptual Understanding,", filed May 28, 2008.

* cited by examiner

PROCESSING PUBLISHING RULES BY ROUTING DOCUMENTS BASED ON DOCUMENT CONCEPTUAL UNDERSTANDING

BACKGROUND OF THE INVENTION

Field of the Invention

Embodiments of the invention relate to enforcing compliance with publishing rules. More specifically, embodiments of the invention relate to a system and method for processing publishing rules by routing documents based on document conceptual understanding and to a content creation system configured to provide prompt feedback on document content coverage.

Description of the Related Art

Frequently, an organization may wish to desire how, when, and/or what is published by representatives of the organization. For example, from a marketing perspective, an organization may prefer publications to stay "on message" with a consistent look, feel, and content. However, the issue can go much further. In some cases, an organization may be required to limit what is published through contract, regulation, or policy. For example, when an organization becomes involved with a collaboration partner, a collaboration agreement may specify control over what one party to the collaboration publishes about the other. A common arrangement is to require one party to provide the collaboration partner with an advance review copy prior to publication. Doing so allows the collaboration partner to vet the contents of a document prior to its publication.

Of course, prior to entering an agreement with the collaboration partner, the organization needs to provide assurances that mistakes will not be made in the first place (people tend to like to do business with those that can demonstrate a series of checks and balances exist to ensure that they can keep their word). At the same time, in a large organization, maintaining control over everything that may become public can be quite difficult. Thus, problems can arise in large organizations with an agreement that requires third party approval of publications. In such an organization, many people may be working on very different projects that are sometimes only loosely related and individuals may have only passing knowledge of each others work. Frequently, a full inter-departmental review of all published documents is not really an option. Unfortunately it is common to know a lot about the successes of collaboration partners while knowing very little about the contractual requirements in place with those collaboration partners. Obviously, when talking with potential partners, everyone wishes to demonstrate as much synergy with current partners as possible. As a result, it is nearly impossible to keep tabs everywhere on what can be said about specific projects within various departments. The cost of not saying anything is lost additional partners and customers to your competitors—the cost of saying too much is potential loss of key partners and even legal action for breaching contracts.

Further, the Internet, and the rising popularity of "blogs" in particular, has led to a dramatic increase in the number of sources for individuals to publish information about the organization. On one hand, allowing individual employees to publish information about what they do, in their own words may be very beneficial to the organization. Accordingly, an organization may wish to sponsor (or simply condone) individual blogs where employees relate information about what they do within the company on a day-to-day basis. On the other hand, even well-intentioned individuals may sometimes disclose information that the organization, by way of contract, regulation, or policy, wish to maintain as confidential. Similarly, as described above, some disclosures may require approval by the organization and/or third parties (e.g., in the case of a collaboration partner) prior to publication.

SUMMARY OF THE INVENTION

One embodiment of the invention includes a method for processing a publishing rule. The method may generally include receiving a document which includes content intended for publication and parsing the document to identify at least one reference associated with a workflow. The workflow may specify a sequence of computer-implemented steps to perform prior to publication of a document to comply with the publishing rule. For each step in the workflow, (i) an individual responsible for performing the step is identified, (ii) the document is routed to the individual responsible for performing the step, and (iii) an indication may be received that the individual has performed the step. The method may also include, upon determining that each step in the workflow has been performed, the document may be routed for publication.

Another embodiment of the invention includes a computer readable storage medium containing a program which, when executed, performs an operation for processing a publishing rule. The operation may generally include receiving a document which includes content intended for publication and parsing the document to identify at least one reference associated with a workflow. The workflow specifies a sequence of computer-implemented steps to perform prior to publication of a document to comply with the publishing rule. For each step in the workflow, (i) an individual responsible for performing the step is identified, (ii) the document is routed to the individual responsible for performing the step, and (iii) an indication may be received that the individual has performed the step. The method may also include, upon determining that each step in the workflow has been performed, the document may be routed for publication.

Still another embodiment of the invention includes a system having a processor and a memory containing a program that, when executed by the processor, performs an operation for processing a publishing rule. The operation may include receiving a document which includes content intended for publication and parsing the document to identify at least one reference associated with a workflow. The workflow specifies a sequence of computer-implemented steps to perform prior to publication of a document to comply with the publishing rule. For each step in the workflow, (i) an individual responsible for performing the step is identified, (ii) the document is routed to the individual responsible for performing the step, and (iii) an indication may be received that the individual has performed the step. The method may also include, upon determining that each step in the workflow has been performed, the document may be routed for publication.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the invention provide a system and method for both enforcing and tracking compliance with publishing rules in an automated and provable manner. Thus, embodiments of the invention may help ensure that agreements with collaboration partners are adhered to in a dynamic business environment. At the same time, embodiments of the invention may help reduce cost and time to release of information that can be leveraged to business advantage. Rules governing the publication of information (referred to as "publishing rules") may exist by way of contract, regulation or company policy. Each such publishing rule may specify some action that must be performed prior to publishing a document that includes some element of content specified by the rule (e.g., mentions activities made with a collaboration partner or the collaboration itself).

Further, embodiments of the invention enable the creator of information to better understand, a priori, what vetting requirements exist for content they create and intend to publish (e.g., content in a blog post or a press release). This allows content authors a great deal of flexibility in both what to decide to say and allows authors weigh the importance of including statements in a document to be published against the requirements of publishing rules related to such statements. Doing so allows content authors to examine different styles of presenting partnerships, for example, as well as provides authors with a "heads-up" on the amount of "back-end processing" they might have to schedule time for in order to get their document published. At the same, the organization is provided with assurances that contractual obligations are adhered to and provided with an auditable trail of compliance. This aspect may encourage the organization to allow employees with a greater degree of freedom to discuss issues regarding what they do in a public forum (e.g., an employer sponsored blog space for employees to discuss their respective roles within the organization).

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
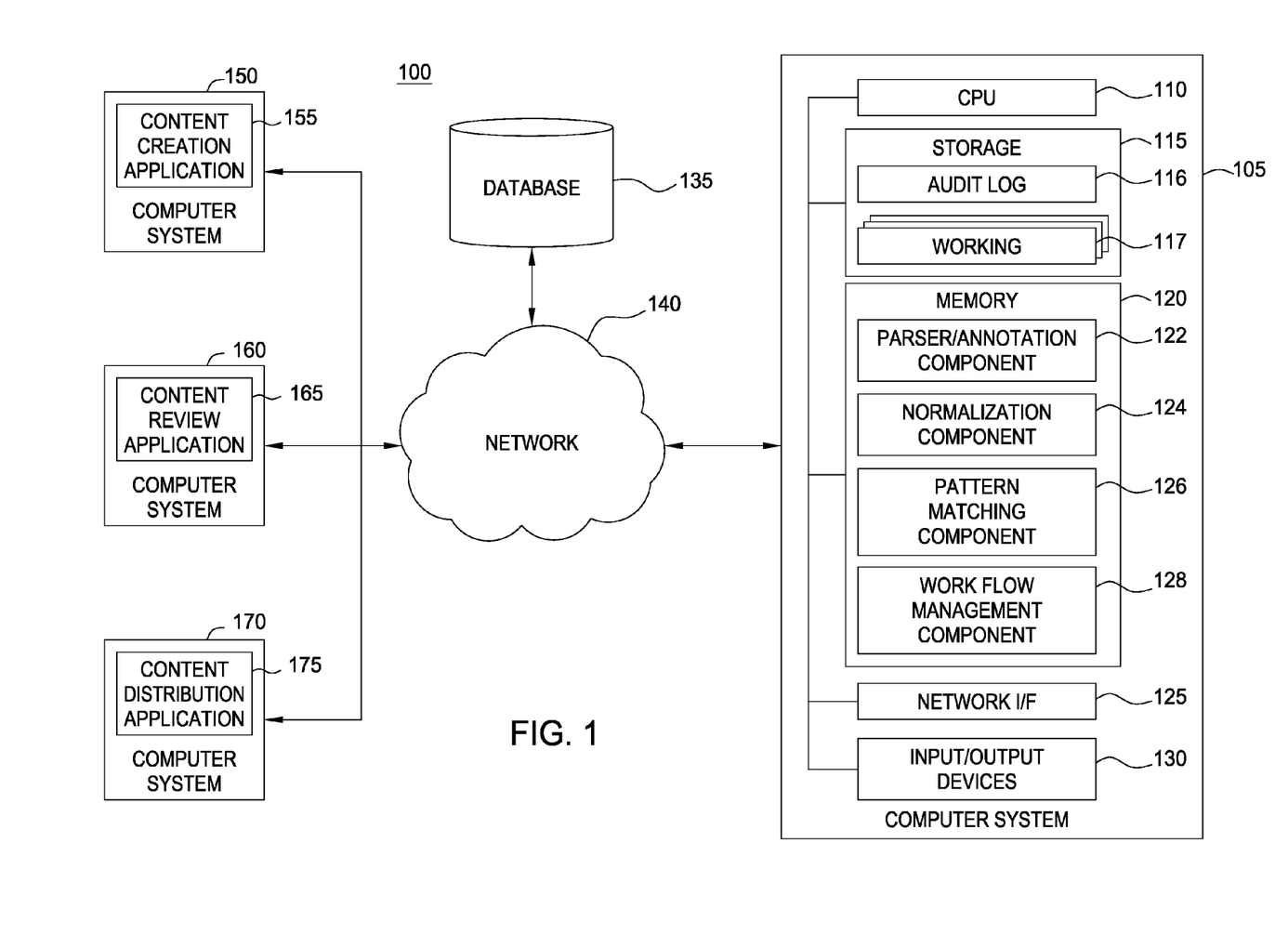
FIG. 1 is a block diagram illustrating components of a computing environment, configured according to one embodiment of the invention.

FIG. 1 is a block diagram illustrating components of a computing environment 100, configured according to one embodiment of the invention. As shown, computing environment 100 includes computer systems 105, 150, 160, and 170, and a database system 135. Generally, the computer systems 105, 150, 160, and 170 and database system 135 illustrated in the computing environment 100 may include existing computer systems, e.g., desktop computers, server computers, laptop computers, tablet computers, and the like. The computing environment 100 illustrated in FIG. 1, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

As shown, computer system 105 includes a central processing unit (CPU) 110, which obtains instructions and data from storage 115 and memory 120. CPU 110 is a programmable logic device that performs all the instruction, logic, and mathematical processing in a computer. Storage 115 stores application programs and data for use by computer system 105. Storage 115 may include hard-disk drives, flash memory devices, optical media and the like. Computer systems 105, 150, 160, 170, and database 135 are shown connected to a network 140, which generally represents any kind of data communications network. Accordingly, the network 140 is representative of local and wide area networks, including the Internet. Storage 115 and memory 120 may also store an operating system (OS) 109 for managing the operation of the computer system 105. Examples of an OS include a UNIX distribution, versions of the Microsoft Windows® operating system, and distributions of the Linux® operating system. (Note, Linux is a trademark of Linus Torvalds in the United States and other countries.)

Illustratively, memory 120 of computer system includes a parser/annotation component 122, a normalization component 124, a pattern matching component 126, and a workflow management component 128. Also, storage 115 is shown to include an audit log 116 and a collection of workflows 117.

The parser/annotation component 122 may provide a software application configured to parse a document that includes one or more publishing rules regarding documents intended for publication to identify a set of structured components or fragments (e.g., a contract with a collaboration partner or an organizational policy). In one embodiment, the parser/annotation component 122 may be configured to parse such a document using a UIMA architecture. UIMA is an acronym for Unstructured Information Management Architecture. As is known, UIMA provides a component based software architecture for the development, discovery, composition, and deployment of multi-modal analytics used to analyze unstructured information. A UIMA framework may be used to develop computer applications that can acquire unstructured information in a raw form for analysis and use by software tools such as databases, search engines, and knowledge management systems. For example, the parser/annotation component 122 may be configured to convert unstructured documents (e.g., a document to be published or a contract between two collaborating organizations) into a structured form (e.g., an XML document). The UIMA framework for this scenario could be configured to recognize proper nouns for companies (or references to companies such as "you," "we," and "us") and to parse the types of actions suggested by the text within the document as it relates to the proper nouns (organizations typically) that are found. Further, in the case of parsing and analyzing a contract between an organization and a collaboration partner, the parser/annotation component 122 may be configured to identify portions of a contract that govern the publication of information about the collaboration (e.g., the publication of a joint press release).

Additionally, once parsed and annotated, the normalization component 124 may be configured to normalize elements of the parsed document. For example, anaphoric references in a contract such as "you," "we," and "us" may be normalized to identify which contracting party a given reference refers. The pattern matching component 126 may provide a software application configured to be used to compare normalized fragments from a contract against a repository of contractual components or patterns. The results of the comparing may yield a "best-fit" contractual pattern from the repository for each normalized fragment. Thus, when a contract includes a provision that requires an organization to provide an advance review copy of any press relates that mentions a collaboration partner to the collaboration partner, then the pattern in the repository could be an "advance review pattern" that includes the organization, a collaboration partner, and an obligation to provide the advance review copy, as specified in the contract. Further, once a pattern is identified, it may be used to create steps for a workflow 117 associated with that contract. The repository of contractual components may be defined in a component language supporting standardized and interchangeable concepts (e.g., in the form of an XML grammar) and may be stored in database 135.

In one embodiment, the pattern matching component 126 may be configured to compare known components from a parsed and normalized document and find the best fitting repository component in database 135. That is, for a given normalized contractual fragment, the pattern matching component 126 may be configured to identify the contractual pattern in database 135 that most closely matches with that pattern. When a contract includes multiple parsed components, the workflow management component 128 may be configured to take the matched repository component from database 135 for each one and stitch them together into a workflow 117. Each workflow 117 may specify a sequence of steps related to a given contractual provision.

In some cases, the pattern matching component 126 may not identify a complete match between a given fragment and the best-fitting pattern. For example, assume that a contract requires a collaboration party be given an opportunity to review any press release mentioning the collaboration, but does not specify how long the collaboration partner has to review such a document. To address this issue, in one embodiment, the workflow management component 128 may be configured to highlight missing, vague or unspecified/clarified requirements such as this within a contractual document. Further, in such a case, the workflow created from such a contract may allow an administrator to add information to the workflow, such as how long to wait once a document is provided to a collaboration partner before it is published. Similarly, the administrator can add responsible parties to the workflow, such as the individual at the collaboration partner the press release is to be sent and who at the organization is responsible for administering a given workflow 117.

Additionally, the workflow management component 128 may be configured to initiate and execute a given workflow. For example, continuing with the joint press release example, in one embodiment, the author of the press release submits it to the workflow management component 128 which, using the parser/annotation component 122, the normalization component 124, and the pattern matching component 126 described above, may be configured to analyze the content of the press release, identify a workflow 117 (e.g., a workflow for providing content to a collaboration partner named in the release prior to the publication of the release), and route the document to the appropriate individuals at the organization and the collaboration partner (as specified by the workflow 117). Further, if multiple levels of review, or multiple steps are included in the workflow 117, the workflow 117 management component 128 may be configured to receive a response approving (or rejecting) the document for publication and route the document for further review as appropriate (as specified by the workflow 117). Still further, the record of each completed workflow step may be stored in audit log 116, providing the organization with a provable record of compliance with the publishing rules related to the collaboration.

Additionally, FIG. 1 shows a computer system 150 executing a content creation application 155, a computer system 160 executing a content review application 165, and a computer system 170 with a content distribution application 175. In one embodiment, the content creation application 155 may allow an individual to create content for publication. For example, the content creation application 155 may be a simple word processor or other text editor. However, the content creation application may include applications configured to generate multimedia content, web pages, and other forms of media for distribution. For example, the content creation application 155 may be a blog-creation application (or web-browser used to access such an application). As described in greater detail below, in one embodiment, the content creation application 155 may include a background task used to monitor content as it is created for a particular document.

Content review application 165 may be configured to view content for review routed by workflow management component 128. For example, assume, for a joint press release with a collaboration partner, that a workflow 117 specifies that a press release should be reviewed both by a copy editor and an individual with responsibility for marketing a product mentioned in the press release, before being provided to the collaboration partner. In such a case, the workflow management component 128 may be configured to route the appropriate individual which reviews the document using content review application 165. Further, in one embodiment, the content review application 165 may allow the reviewing individual to approve (or reject) or modify the content before further steps of the workflow 117 are performed. Again, a record of each step of the workflow being performed may be captured by the audit log 116.

Once the workflow 117 is completed, content distribution application 175 running on the computer system 170 may be configured to publish approved content. Content distribution application 175 may be configured to transmit a press release to the appropriate press agency, or publish content on a company website or publish a post on an individual's blog. Of course, any manner of other content distribution of approved documents is also contemplated.

Figure 2:
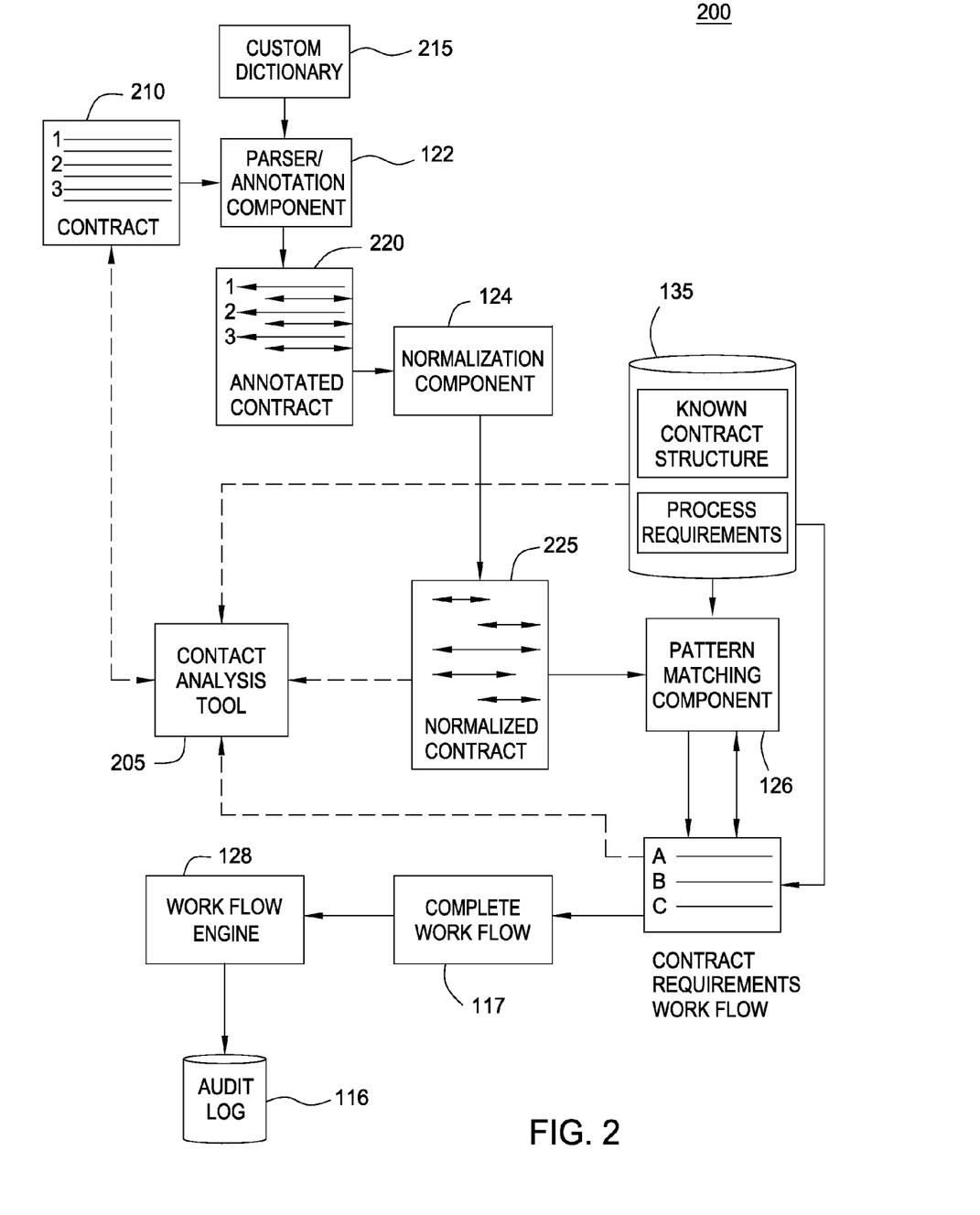
FIG. 2 is a block diagram illustrating the components of the computer system illustrated in FIG. 1 being used for processing publishing rules by routing documents based on document conceptual understanding, according to one embodiment of the invention.

FIG. 2 is a block diagram illustrating the components of the computing environment 100 illustrated in FIG. 1 being used for processing publishing rules by routing documents based on document conceptual understanding, according to one embodiment of the invention. As shown, a contract 210 is supplied to the parser/annotation component 122. For purposes of this example, assume that contract 210 includes the sample portion of a contract between an organization and a collaboration partner sets forth in Table 1.

TABLE I

Contract Example (1) Our company agrees to allow Your Company to review all collaboration based media correspondence prior to it being made public.
(2) The review process by Your Company is not to extend beyond a two week timeline without an exception process between the two companies being mutually agreed to. Your company can either approve or decline the communication. In the case of decline, recommendations of desire changes must be provided in writing.
(3) All official collaboration based media correspondence must follow this process and the fact that this process has been followed must be auditable, upon request, by Your Company. Record of historical correspondence must be tracked for a minimum of two years.

In this example, the collaboration partner is referred to as "Your Company" and the organization is referred to as "Our Company." The contract requires the organization to provide "all collaboration based media correspondence prior to it being made public." And also requires the collaboration partner to have a review process "not to extend beyond a two week timeline." Further, the contract requires the organization to maintain a record of all media correspondence and proof that the review procedure described in the first two paragraphs occurred "for a minimum of two years."

In one embodiment, the contract 210 is provided to the parser/annotation component 122 which is configured to parse and annotate the contract to identify portions related to publication of information. FIG. 2 represents the output of the parser/annotation component 122 as annotated contract 220. Table II illustrates an example of the first paragraph of the contract in table 1 after being annotated by the parser/annotation component 122.

TABLE II

Annotated Contract Example (1) <organization identity=us> Our company </organization> <obligation> agrees to allow </obligation> <organization identify=collaboration partner> Your company </organization> to <action> review </action> <quantifier> all </quantifier> <object> collaboration based media correspondence </object> <timeframe> prior </timeframe> to it <action> being made public</action>

In this example, the custom dictionary 215 includes a set of markup tags applied to the first paragraph of the contract in table 1. Specifically, the custom dictionary 215 includes the following tags: <organization>, <obligation>, <action>, <quantifier>, <object>, and <timeframe> applied to the relevant portions of the contract 210. Of course, one of skill in the art will recognize that these particular tags are used to highlight the present invention and custom dictionary 215 may be tailored to suit the needs of an individual case. The second and third paragraphs of the contract may be annotated in a similar manner. For simplicity, however, the following discussion is focused on processing the first paragraph of the contract set forth in Table I.

The annotated contract 220 may then be supplied to the normalization component 124, which may be configured to normalize terms into language independent concepts. That is, the normalization component 124 may normalize different portions with similar meaning but different specific text into a common form. In one embodiment, an ontology relating contractual terms may be used to relate different terms with similar meaning in annotated contract 220. The contractual ontology does not need to be a single object. Multiple ontologies could be used for normalization for different usage scenarios. For example, the two annotated fragments of <action>being made public</action> and <action>published</action> may each normalize to the concept in a contractual ontology of "public release." FIG. 2 represents the output of the normalization component 124 as normalized contract 225. In one embodiment, once normalized, the pattern matching component 126 may be configured to restructure the normalized contract 225. For example, the pattern matching component 126 may discard extraneous information (e.g., non-annotated information).

For example, Table III illustrates an example of the first paragraph of the contract in Table 1 after being normalized by normalization component 124 and restructured by pattern matching component 126.

TABLE III

Language Independent, Normalized Contract Example

```
<initiator>
    <organization identity=us>Our Company</organization>
</initiator>
<operation>
    <quantifier>all</quantifier>
    <obligation>agrees to allow</obligation>
    <action>review</action>
    <object>collaboration based media correspondence</object>
</operation>
<recipient>
    <organization identity=collaboration partner>Your company</organization>
</recipient>
<instigation>
    <timeframe>prior</timeframe>
    <action>public release</action>
</instigation>
```

Using this form of the original contract 210, the pattern matching component 126 searches database 135 for a repository element that most closely matches the input. For example, assume pattern repository in database 135 includes the following pattern:

TABLE IV

Publishing Rule, Advance Review Pattern

```
<element id=1>
  <initiator type:organization>
    <organization - us>Our company</organization>
  </initiator>
  <operation type:operation>
    <quantifier>
      <optional; assumed to be all when not provided>
    </quantifier>
    <obligation>
      <optional; assumed to be agrees to allow when not provided>
    </obligation>
    <action>
      <required>
    </action>
```

TABLE IV-continued

Publishing Rule, Advance Review Pattern

```
    <object>
      <required>
    </object>
    <initiator_controller type:person>
      <processRequired>
    </initiator_controller>
    <recipient_controller>
      <processRequired>
    </recipient_controller>
    <operationMeans>
      <optional; assumed e-mail when not provided>
    </operationMeans>
  </operation>
  <recipient type:organization>
    <organization - contract participant>
      <required>
    </organization>
  </recipient>
  <instigation type:activation>
    <timeframe>
      <optional; assumed prior to when not provided>
    </timeframe>
    <action>
      <required>
    </action>
  </instigation>
</element>
<element id=2>
...etc....
</element>
```

Note, each tagged element in the Language Independent, Normalized Contract of Table III is present in Table IV, but not the other was around. Assume for this example that this "Advance Review Pattern" repository element is found to be the best fit for the Language Independent, Normalized Contract of Table III. In one embodiment, a contract analysis tool 205 may be configured to validate that all the contractual requirements of the best-fitting pattern are satisfied by the input; namely, in this example the fragment in Table III. If a contractual element required by the best-fitting pattern is not met by the input, the workflow management component 128 may provide a warning message to the user or administrator and they can either choose to provide a value for the missing contractual element, pick a different repository component, or deal with the issue in some other way within their organization. In this example, elements of the pattern labeled as "<required>" should be present in the input pattern or addressed as appropriate by a user.

Once each required element of the pattern is satisfied, the process requirements are analyzed in order to generate a workflow 117 for the input pattern. In this example, elements tagged using the <processRequired> tag in the example pattern of Table IV are each used to create a step for workflow 117. In one embodiment, the workflow management component 128 may present a user with an interface showing each particular repository element populated with the known information from the contractual information. For example, the initiator_controller and recipient_controller are typed as person allowing them to be represented by employee ID, email address, or other instance specific means. The above process is used for all the contractual requirements of the document. Details for each of the contractual components are completed. Once completed, the workflow may be stored as an available workflow used by individuals within the organization to publish content in a manner driven by the requirements of a particular contract.

Figure 3:
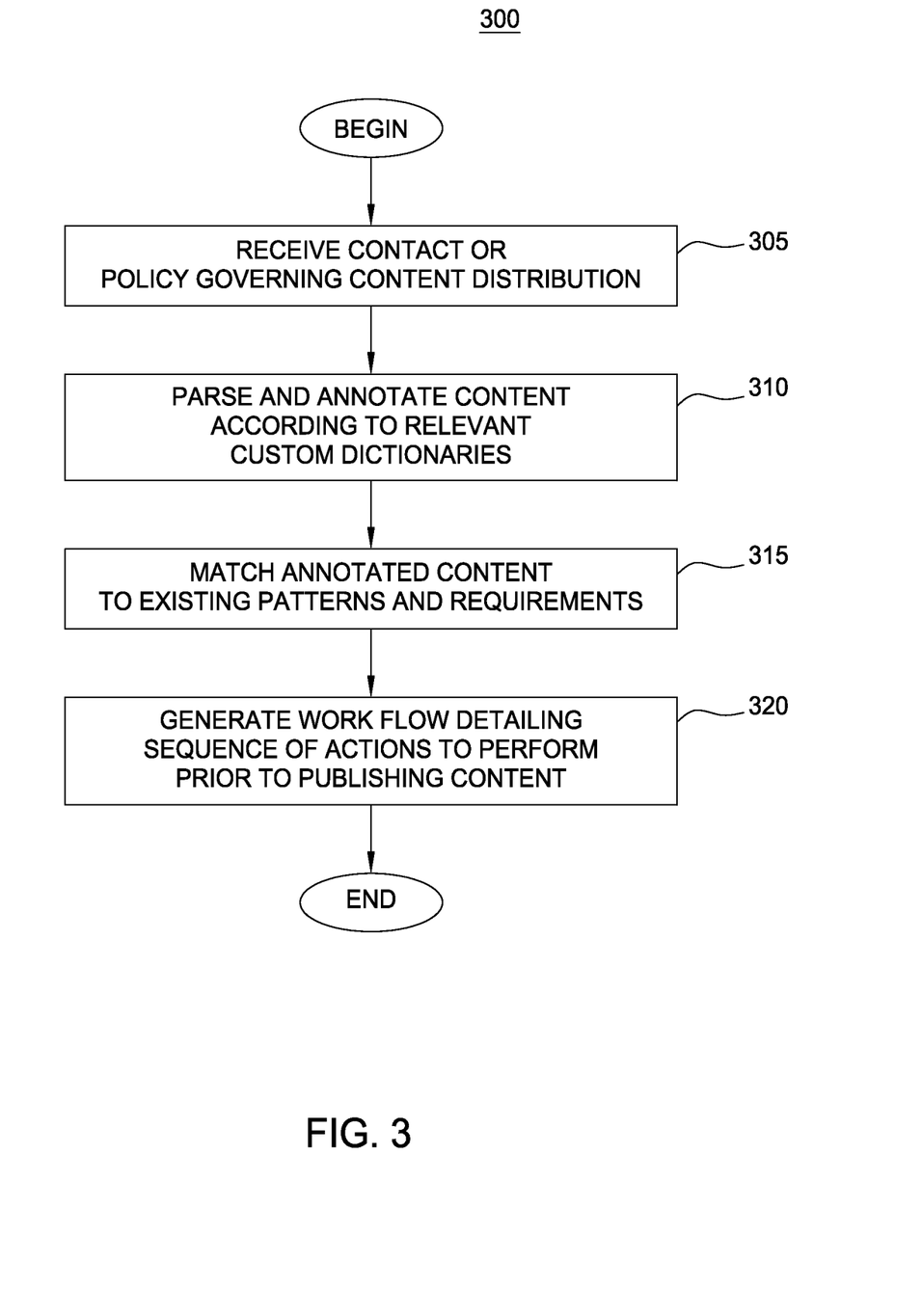
FIG. 3 illustrates a method for processing publishing rules by routing documents based on document conceptual understanding, according to one embodiment of the invention.

FIG. 3 illustrates a method 300 for processing publishing rules by routing documents based on document conceptual understanding, according to one embodiment of the invention. More simply, the method 300 follows the workflow creation process described in conjunction with FIG. 2. As shown, the method 300 begins at step 305 where the parser/annotation component receives a document that governs content distribution. In one embodiment, the parser may be configured to divide the contract into a number of fragments and annotate each one. In the example above, the document was a contract between an organization and a collaboration partner specifying steps the organization should follow to mention the collaboration in public (e.g., a press release) and each paragraph of the contract was parsed and annotated. Of course, other contractual provisions could be parsed in similar manner, as well as other documents, for example, a corporate policy describing how collaboration partners may be referred to in official publications (e.g., a press release), or informal sources (e.g., employee blogs), as well as formal regulatory requirements governing information dissemination.

At step 310, the parser/annotation component may be configured to parse and annotate the content of the document received at step 305, based on a relevant dictionary. For example, Table II, above, shows a contract provision annotated with markup tags. Additionally, the normalization component may normalize marked-up content based on a semantic meaning of the marked up content. In one embodiment, an ontology may be used to normalize terms with a similar meaning to a common form representing that meaning. At step 315, the pattern matching component may evaluate the normalized, annotated content to identify a matching pattern in a repository of patters to identify a "best-fit" pattern. Further, as described above, the "best-fit" pattern may include any number of required elements, each of which must be present, or resolved by a user/administrator prior to generating a workflow for the document received at step 305 using the best-fit pattern.

At step 320, the workflow management component 126 may generate a workflow detailing a sequence of actions to perform in order to comply with a provision of the contract received at step 305. As described above, for example, a workflow is generated for processing a document intended for public release that references a collaboration partner. The particular contract includes a requirement that the collaboration partner be provided with the an advance review copy of all such documents, and the workflow is configured to route a given document to the relevant parties, as well as to record a log documenting that the provision was, in fact, complied with prior to such documents being published.

Figure 4:
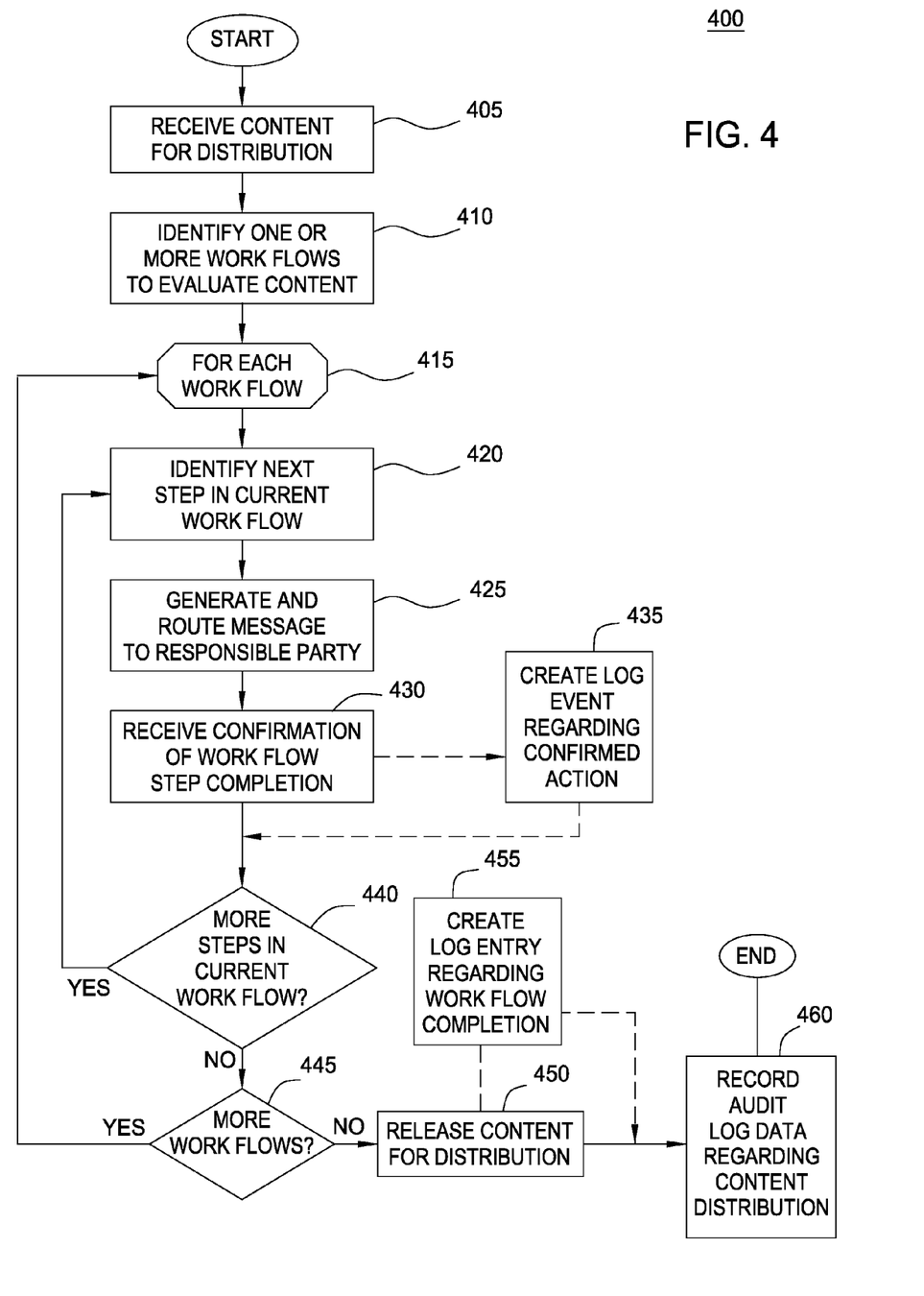
FIG. 4 illustrates a method for publishing a document in compliance with a collection of publishing rules, according to one embodiment of the invention.

FIG. 4 illustrates a method 400 for publishing a document in compliance with a collection of publishing rules, according to one embodiment of the invention. As shown, the method 400 begins at step 405 where content for distribution is received. For example, the document may be a press release submitted to the workflow management component for approval, or a blog post authored by a company employee. At step 410, the workflow management component may be configured to identify one or more workflows that need to be performed prior to publishing the content.

At step 415, a loop (steps 420-445) is used to process each workflow identified at step 410. At step 420, the workflow management component may be configured to identify the next step in a current workflow being performed. For example, using the workflow described above in conjunction with FIG. 2, the workflow relates to a requirement to obtain approval from a collaboration partner prior to referring to the partner. Further, the workflow generated for this requirement may include contact information for an individual at the collaboration partner tasked with reviewing content (e.g., an email address). Accordingly, in such a case, at step 425, the workflow management component may generate an email message requesting review of the document received at step 405. Further, the workflow management component may also create a log to document that the content was sent to the appropriate individual at the collaboration partner for review.

At step 430, the workflow management component may receive a message (e.g., a response to the email) approving (or rejecting) or revising the content. If approved, a log record may be created to document that approval was received from the collaboration partner. At step 440, if more steps are included in the current workflow, then the method returns to step 420 to execute additional workflow steps. Otherwise at step 445, if additional workflows remain, they may be executed. Note however, in some cases multiple workflows may be sequential, i.e., one workflow may need to be executed prior to another. However, in another case, multiple workflows may be executed in parallel.

At step 450, once all applicable workflows have been executed, the content may be released for distribution. And at step 455, a log record may be generated to document that the content was published after each applicable workflow had been performed.

In addition to providing a system and method for both enforcing and tracking compliance with publishing rules in an automated and provable manner, embodiments of the invention may be used to provide an author of information to better understand, a priori, what vetting requirements exist for content they create and intend to publish (e.g., content in a blog post or a press release). This allows content authors a great deal of flexibility in both what to decide to say and allows authors weigh the importance of including statements in a document to be published against the requirements of publishing rules related to such statements.

Figure 5:
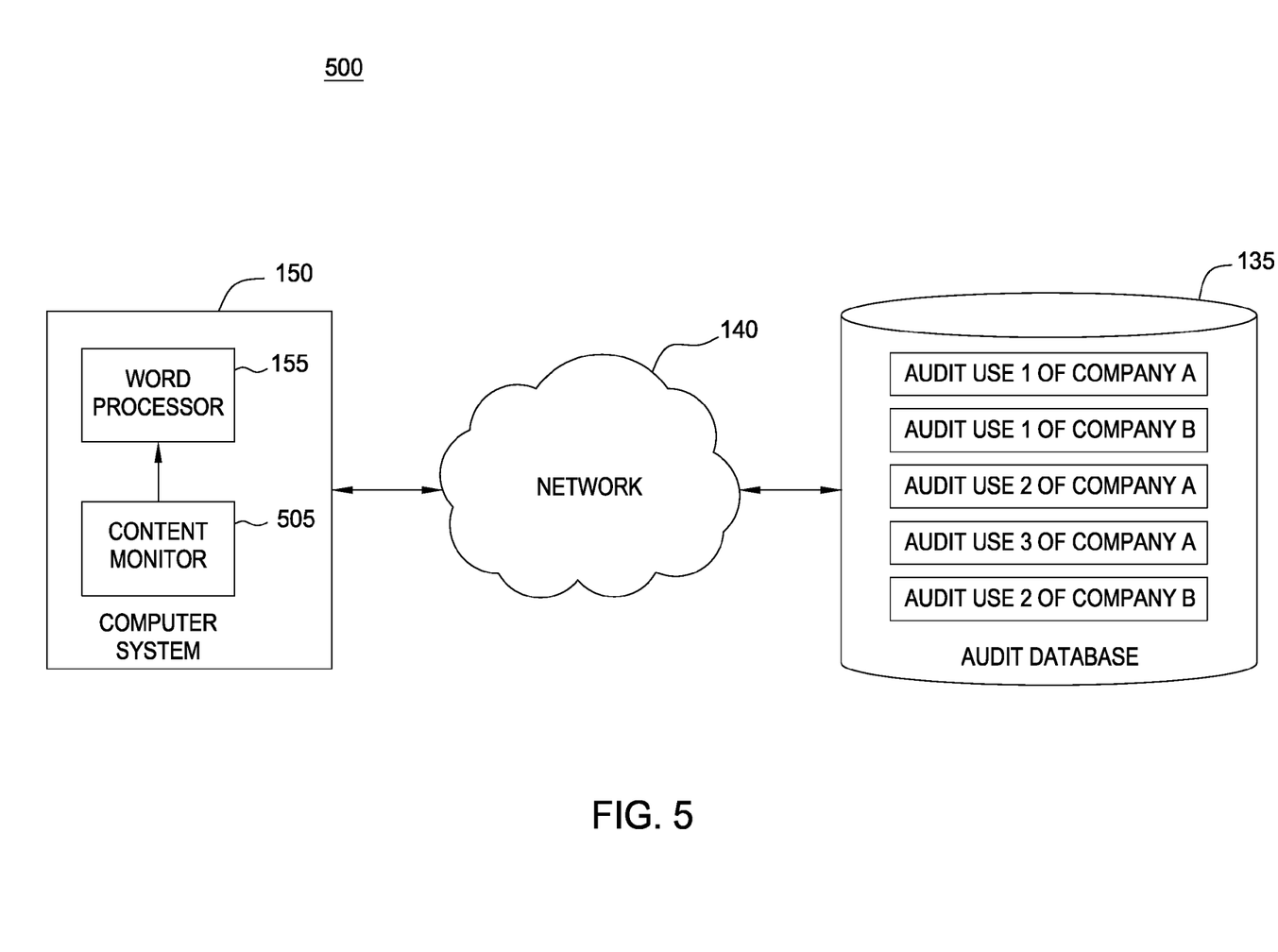
FIG. 5 is a block diagram illustrating a content creation system aligned for providing instantaneous feedback on content coverage, according to one embodiment of the invention.

FIG. 5 is a block diagram illustrating a content creation system 500 configured to provide prompt feedback on content coverage, according to one embodiment of the invention. As shown, system 500 includes the computer system 150 and content creation application 155, in this case a word processor application. Additionally, computer system 150 also includes a content monitor 505. In one embodiment, the content monitor 505 provides a software application configured to run as a background task (i.e., configured to run without disrupting the use of word processor 155 by a content author. Further, the content monitor 505 may be configured to monitor the creation of content by the content author as the document is being created.

The annotation processing parses and explores the semantic meaning of the document using the processes described above. If a series of statements that warrant an approval process are found, e.g., a sentence that references a collaboration partner, then offsets of such a sentence within the document are captured. The audit record of other documents that have gone through the same process is queried and the average time for the whole process of steps and/or the individual steps is provided to the content author working with a document on word processor 155. FIG. 5 shows database 135 with an audit use history of references to a company "A" and a company "B". These audit records may characterize different uses of a reference to either company. For example, assume an organization has collaborated with company "A" on three projects" and on two projects with Company "B." In such a case, each project may impose different requirements on the organization for publishing information related to one of the collaboration projects.

Further, in each case, a history of audit records related to such publications may be used to predict how long approval of a publication of indication related to a given project may require.

Figure 6:
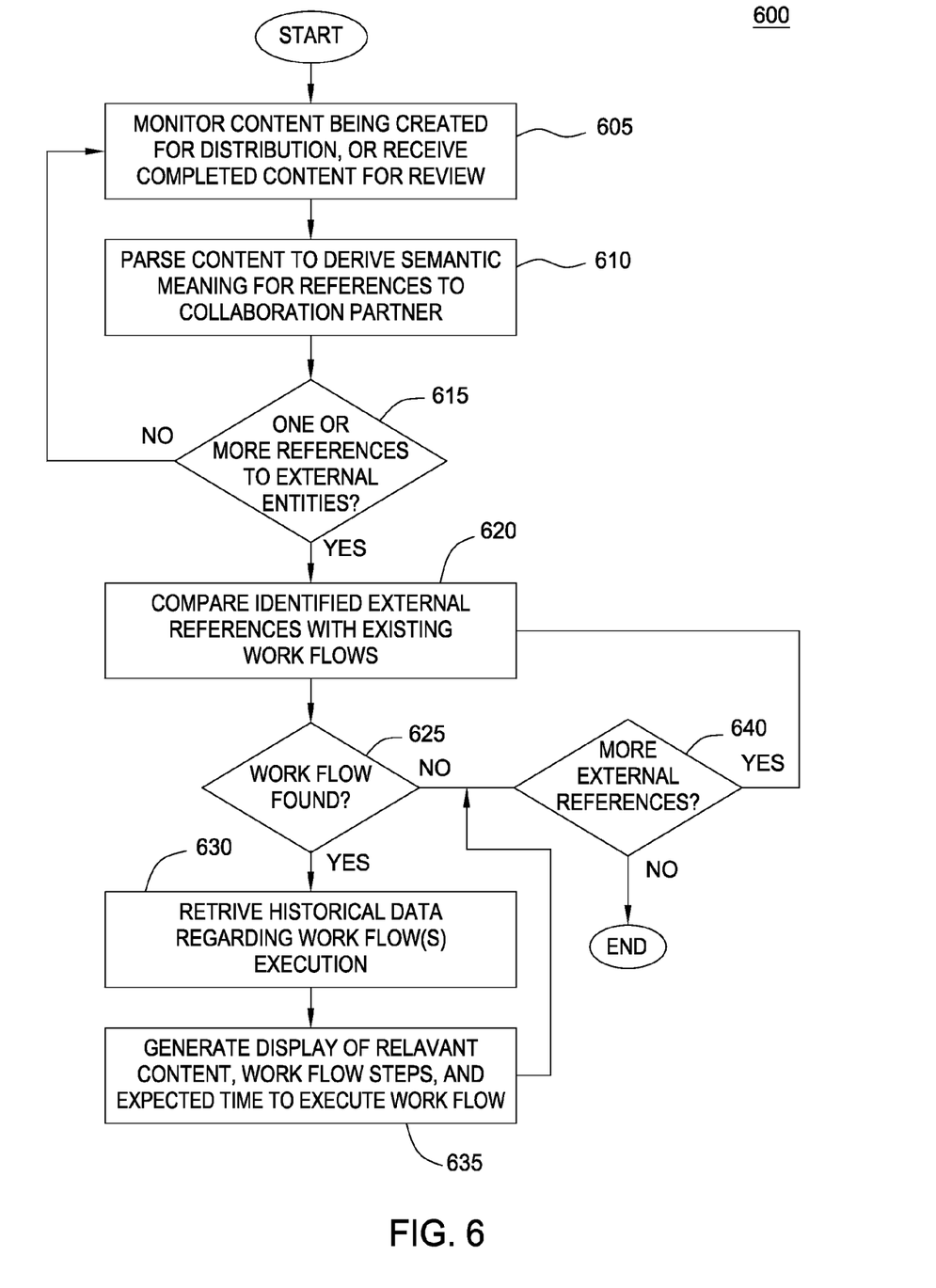
FIG. 6 illustrates a method for providing instantaneous feedback on content coverage, according to one embodiment of the invention.

FIG. 6 illustrates a method 600 for providing a content author with prompt feedback on content coverage, according to one embodiment of the invention. Method 600 uses the example from above of a project between an organization and a collaboration partner, where a document referencing such a project (or the collaboration partner) may need to be reviewed by that collaboration partner prior to publication. As shown, the method 600 begins at step 605 where a background task monitors content being created for potential distribution. In one embodiment, content may be elevated as it is created, generally in a real-time manner. Alternatively, content may be evaluated periodically, e.g., at regular intervals, at the time of an event such as the completion of a sentence, etc. or only when the user selects a specific analyze function from, for example, a menu. At step 610, a parser/annotation component may be configured to parse and annotate the content using the processes described above. For example, the content may be compared against terms in a custom dictionary to identify portions that indicate that the content may need to be processed using a workflow (e.g., references to external collaboration partners). At step 615, if the document does not include any terms in the custom dictionary, then the method may return to step 605 and continue to monitor content as it is authored by a user.

Otherwise, however, where the document currently being authored includes one or more references to an external collaboration partner, then at step 620, the workflow management component may be configured to compare the identified external references with existing workflows with a history of being performed prior to publication of other documents (i.e., not the document currently being authored). At step 630, the audit record of other documents that have gone through the same process is queried and the average time for the whole process of steps and/or the individual steps is determined. At step 635, a display may be generated that highlights the relevant content, workflow steps and predicted time expected to perform the workflow. That is, the user is provided with prompt feedback during document creation regarding the applicable publication approval process, based on the current content of the document, relevant workflows, and prior history of executing a relevant workflow. In one embodiment, this information may be provided as feedback to the user of the application by highlighting within the document the location related to a given workflow, or workflow step. This information may be derived directly from the annotation process. That is, portions of the document may be highlighted based on annotations made to the document content by the parser/annotation component. The display may also present the steps of the rule that were retrieved, giving the user the ability to see what actions have to be taken based on the rule as well as the historical time it has taken to complete the process. This allows the user to see, real time, during document creation, what parts of the document have come into conflict with an existing contraction obligations of the organization and how long they can reasonably expect it to take to address them.

Returning to method 600, at step 640 if more than one reference to an external entity was identified then the method returns to step 620 to identify workflows for another external entity reference until all applicative reference have been evaluated.

Figure 7:
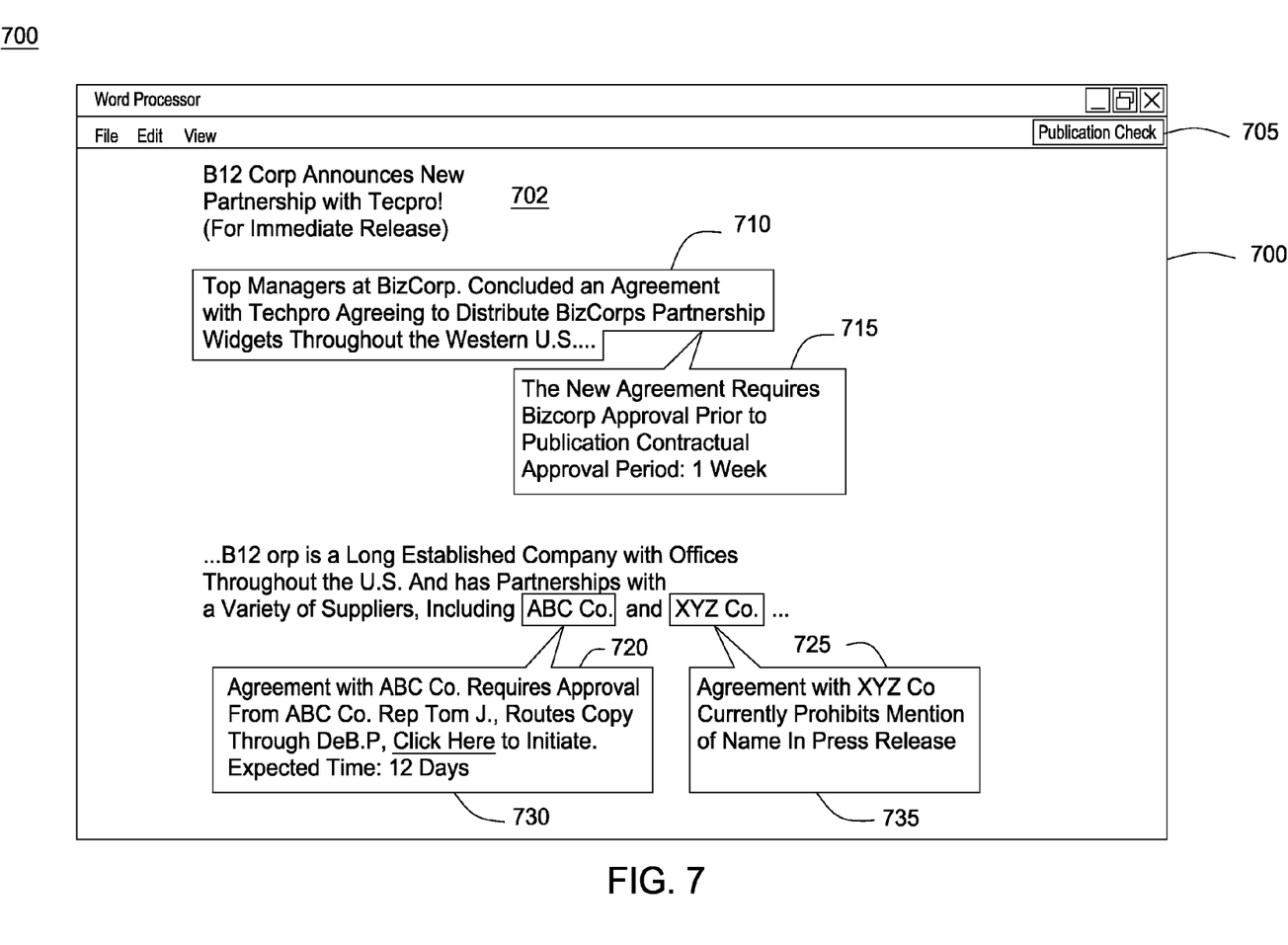
FIGS. 7-8 illustrate a graphical user interface screen configured to provide prompt feedback on content coverage, according to one embodiment of the invention.
Figure 8:
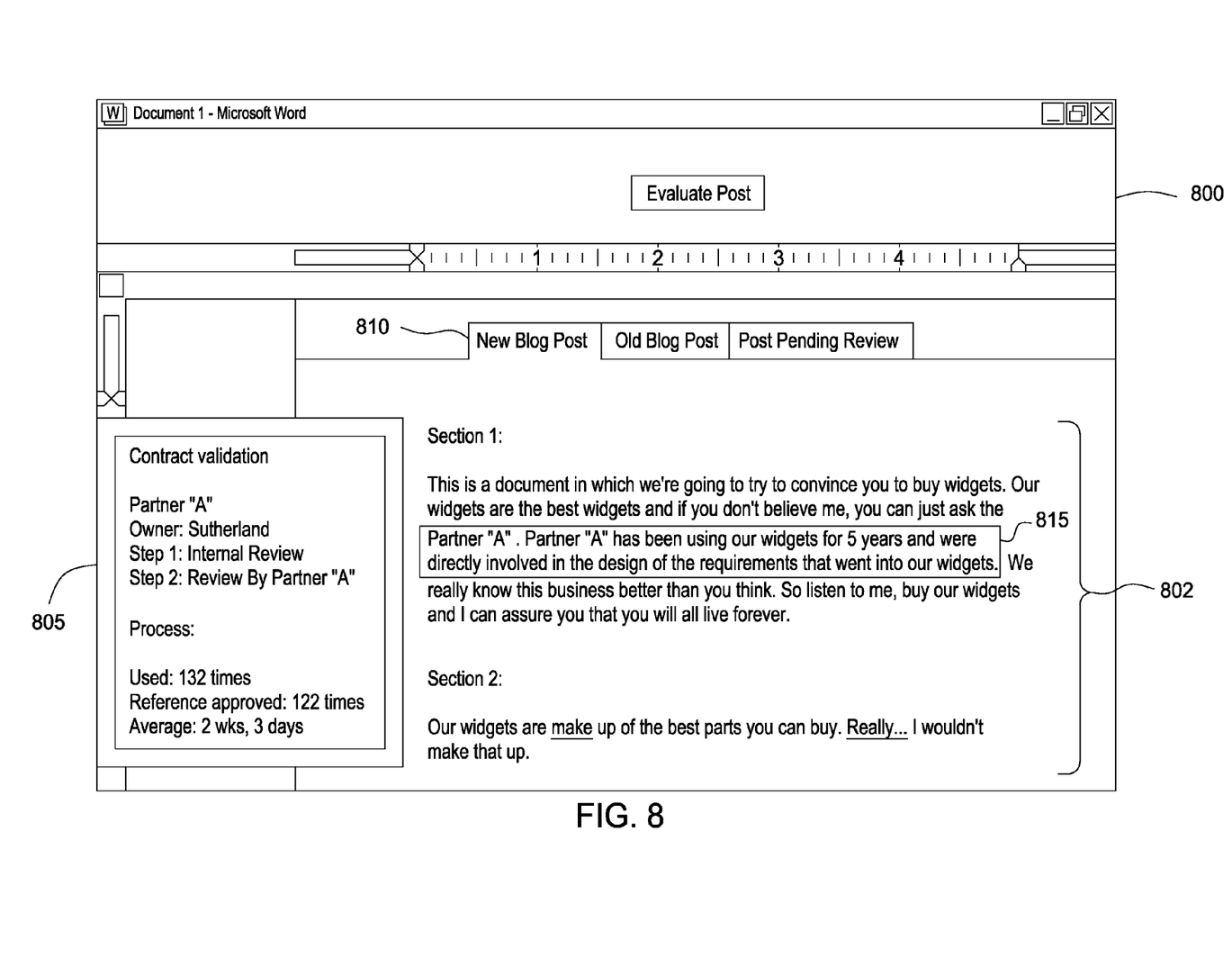

FIGS. 7-8 illustrate graphical user interface screens 700, 800 configured to provide prompt feedback on content coverage, according to one embodiment of the invention. First, FIG. 7 shows a document 702 after a user has performed a publication check (e.g., using button 705). In this example, document 702 represents a press release being authored to announce a partnership between a fictional "bizCorp" and "TecPro" entities. Illustratively, content portions 710, 720, and 725 have been highlighted with pop-up dialogs 715, 730, and 735, each describing a publishing rule implicated by the corresponding content portions 710, 720, and 725 along with a predicted compliance time for obtaining the appropriate review approval for these content portions.

Similarly, FIG. 8 shows the graphical user interface screen 800 associated with an example application used by an employee of an organization to compose a blog post for publication on an employer sponsored blog. In this example, interface screen 800 provides a tabbed interface and a "new blog post" tab 810 is selected. The user has composed content for a new post as text 802. Of course, embodiments of the invention may be applied to other types of content intended for distribution, including multimedia content. Illustratively, a content portion 815 is highlighted, and a dialog box 805 displays information related to a workflow that would need to be performed in order for this content to be published. Further, dialog box 805 provides the user with information related to this workflow, including how many times it has been used (132), how many times it has been approved (122) and a length for an average review period (two-weeks and three days). Of course, one of ordinary skill in the art will recognize that the interface screens 700 and 800 are included to be representative of how a content author may be presented with prompt feedback regarding publishing rules for the content they create, and is not intended to limit the scope of this invention.

Advantageously, embodiments of the invention may be used to improve enforcement and compliance with publishing rules in an automated and provable manner. Thus, embodiments of the invention may help ensure that agreements with collaboration partners are adhered to in a dynamic business environment. At the same time, embodiments of the invention may help reduce cost and time to release of information. Further, embodiments of the invention enable the creator of information to better understand, a priori, what vetting requirements exist for content they create and intend to publish (e.g., content in a blog post or a press release). This allows content authors a great deal of flexibility in both what to decide to say and allows authors weigh the importance of including statements in a document to be published against the requirements of publishing rules related to such statements.

While the foregoing is directed to embodiments of the present invention, other and further embodiments of the invention may be devised without departing from the basic scope thereof, and the scope thereof is determined by the claims that follow.

What is claimed is:

1. A computer-implemented method for processing a first document in compliance with a publishing rule, comprising:
generating a workflow comprising a sequence of computer-implemented steps to perform prior to publishing documents referencing a first organization in order to comply with the publishing rule, wherein the publishing rule requires a second organization to provide content referencing a collaboration between the first organization and the second organization to the first organization prior to publication of the content, and wherein generating the workflow includes:

annotating and normalizing a plurality of fragments of a second document which specifies the publishing rule, wherein the annotating includes converting the second document from an unstructured document to a structured document based on at least a recognition of proper nouns and related actions, and wherein the normalizing includes using one or more ontologies that relate terms to normalize different text with similar meanings into a common form, determining one or more patterns matching the annotated and normalized fragments from a plurality of predefined patterns that are defined in a component language and stored in a database, and generating the workflow based on at least one or more of the matching patterns and information extracted from the second document;

receiving the first document which includes content intended for publication and is authored by the second organization;

parsing, by operation of one or more processors, the first document to identify at least one reference made in a text sentence of the first document to the first organization;

retrieving, based on the at least one identified reference to the first organization, the workflow comprising the steps to perform prior to publishing documents referencing the first organization, wherein at least one step in the workflow comprises:
  (i) identifying an individual that is a member of the first organization and is responsible for performing the step,
  (ii) routing the first document to the individual responsible for performing the step, and
  (iii) receiving an indication that the individual has performed the step; and upon determining that each step in the workflow has been performed, routing the first document for publication.

2. The method of claim 1, further comprising, for each step in the workflow, (iv) recording the indication that the individual responsible for performing the step has performed the step in an audit log.

3. The method of claim 1, wherein the first document for publication is a blog post authored by an individual of the second organization.

4. The method of claim 1, wherein the first document for publication is a press release authored by an individual of the second organization.

5. The method of claim 1, wherein the publishing rule comprises a contractual provision.

6. The method of claim 1, wherein the publishing rule comprises an organizational policy.

7. The method of claim 1, wherein routing the first document for publication comprises publishing the first document on a publicly available computer network.

8. A non-transitory computer readable storage medium containing a program which, when executed, performs an operation for processing a first document in compliance with a publishing rule, the operation comprising:

generating a workflow comprising a sequence of computer-implemented steps to perform prior to publishing documents referencing a first organization in order to comply with the publishing rule, wherein the publishing rule requires a second organization to provide content referencing a collaboration between the first organization and the second organization to the first organization prior to publication of the content, and wherein generating the workflow includes:

annotating and normalizing a plurality of fragments of a second document which specifies the publishing rule, wherein the annotating includes converting the second document from an unstructured document to a structured document based on at least a recognition of proper nouns and related actions, and wherein the normalizing includes using one or more ontologies that relate terms to normalize different text with similar meanings into a common form, determining one or more patterns matching the annotated and normalized fragments from a plurality of predefined patterns that are defined in a component language and stored in a database, and generating the workflow based on at least one or more of the matching patterns and information extracted from the second document;

receiving the first document which includes content intended for publication and is authored by the second organization;

parsing, by operation of one or more processors, the first document to identify at least one reference made in a text sentence of the first document to the first organization;

retrieving, based on the at least one identified reference to the first organization, the workflow comprising the steps to perform prior to publishing documents referencing the first organization, wherein at least one step in the workflow comprises:
  (i) identifying an individual that is a member of the first organization and is responsible for performing the step,
  (ii) routing the first document to the individual responsible for performing the step, and
  (iii) receiving an indication that the individual has performed the step; and upon determining that each step in the workflow has been performed, routing the first document for publication.

9. The computer readable storage medium of claim 8, wherein the operation further comprises, for each step in the workflow, (iv) recording the indication that the individual responsible for performing the step has performed the step in an audit log.

10. The computer readable storage medium of claim 8, wherein the first document for publication is a blog post authored by an individual of the second organization.

11. The computer readable storage medium of claim 8, wherein the first document for publication is a press release authored by an individual of the second organization.

12. The computer readable storage medium of claim 8, wherein the publishing rule comprises a contractual provision.

13. The computer readable storage medium of claim 8, wherein the publishing rule comprises an organizational policy.

14. The computer readable storage medium of claim 8, wherein routing the first document for publication comprises publishing the first document on a publicly available computer network.

15. A system, comprising:
a processor; and
a memory containing a program that, when executed by the processor, performs an operation for processing a first document in compliance with a publishing rule, the operation comprising:

generating a workflow comprising a sequence of computer-implemented steps to perform prior to publishing documents referencing a first organization in order to comply with the publishing rule, wherein the publishing rule requires a second organization to provide content referencing a collaboration between the first organization and the second organization to the first organization prior to publication of the content, and wherein generating the workflow includes:

annotating and normalizing a plurality of fragments of a second document which specifies the publishing rule, wherein the annotating includes converting the second document from an unstructured document to a structured document based on at least a recognition of proper nouns and related actions, and wherein the normalizing includes using one or more ontologies that relate terms to normalize different text with similar meanings into a common form;

determining one or more patterns matching the annotated and normalized fragments from a plurality of predefined patterns that are defined in a component language and stored in a database; and generating the workflow based on at least one or more of the matching patterns and information extracted from the second document, receiving the first document which includes content intended for publication and is authored by the second organization, parsing, by operation of one or more processors, the first document to identify at least one reference made in a text sentence of the first document to the first organization, retrieving, based on the at least one identified reference to the first organization, the workflow comprising the steps to perform prior to publishing documents referencing the first organization, wherein at least one step in the workflow comprises:
(i) identifying an individual that is a member of the first organization and is responsible for performing the step;
(ii) routing the first document to the individual responsible for performing the step; and
(iii) receiving an indication that the individual has performed the step, and upon determining that each step in the workflow has been performed, routing the first document for publication.

16. The system of claim 15, wherein the operation further comprises, for each step in the workflow, (iv) recording the indication that the individual responsible for performing the step has performed the step in an audit log.

17. The system of claim 15, wherein the first document for publication is a blog post authored by an individual of the second organization.

18. The system of claim 15, wherein the first document for publication is a press release authored by an individual of the second organization.

19. The system of claim 15, wherein the publishing rule comprises a contractual provision.

20. The system of claim 15, wherein the publishing rule comprises an organizational policy.

21. The system of claim 15, wherein routing the first document for publication comprises publishing the first document on a publicly available computer network.

* * * * *